June 20, 1939.  A. LYSHOLM  2,162,956

AIRCRAFT POWER PLANT

Filed Feb. 14, 1934  3 Sheets—Sheet 1

INVENTOR
BY
his ATTORNEY

June 20, 1939.   A. LYSHOLM   2,162,956
AIRCRAFT POWER PLANT
Filed Feb. 14, 1934   3 Sheets-Sheet 2
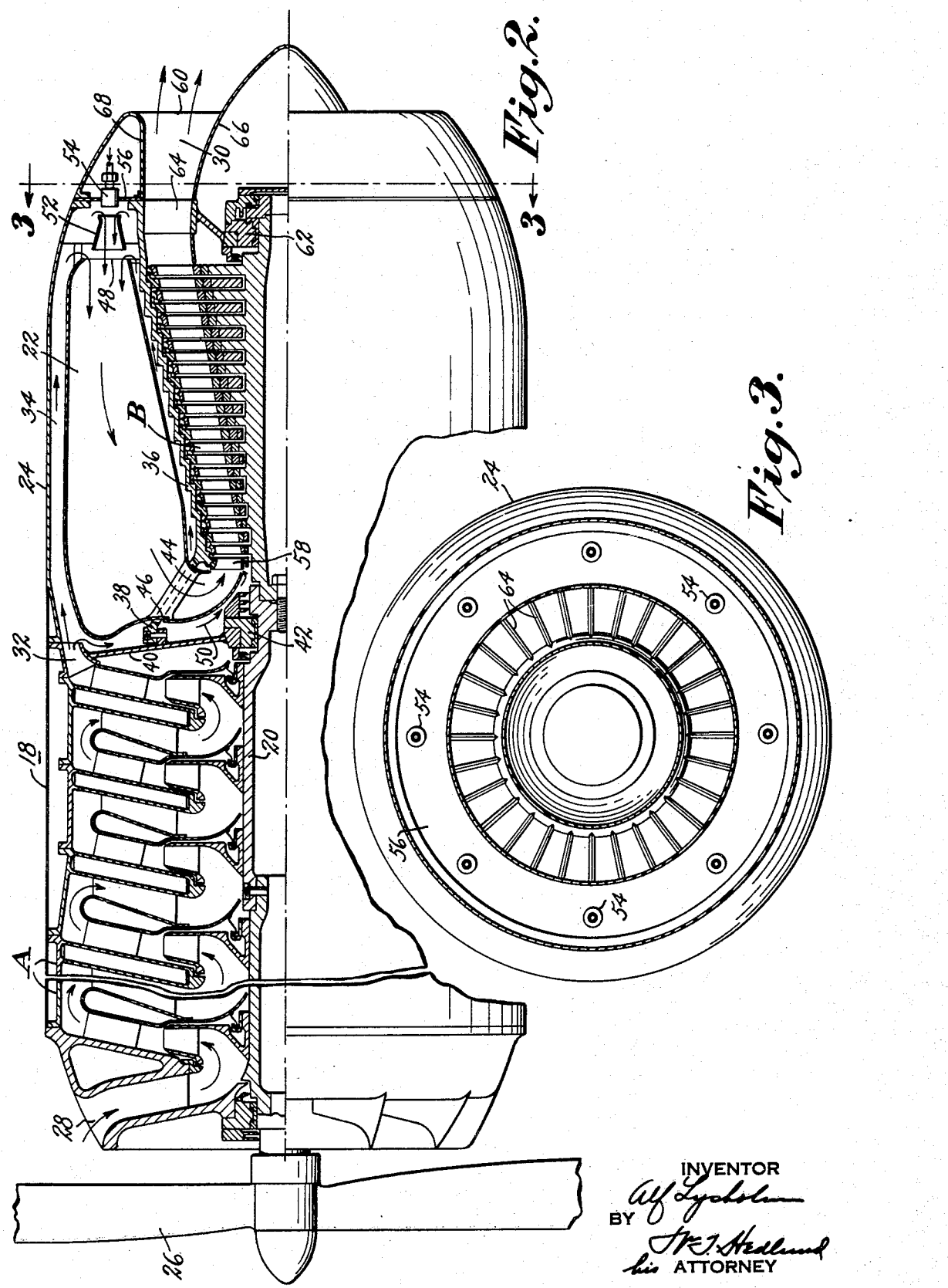
INVENTOR
Alf Lysholm
BY
his ATTORNEY

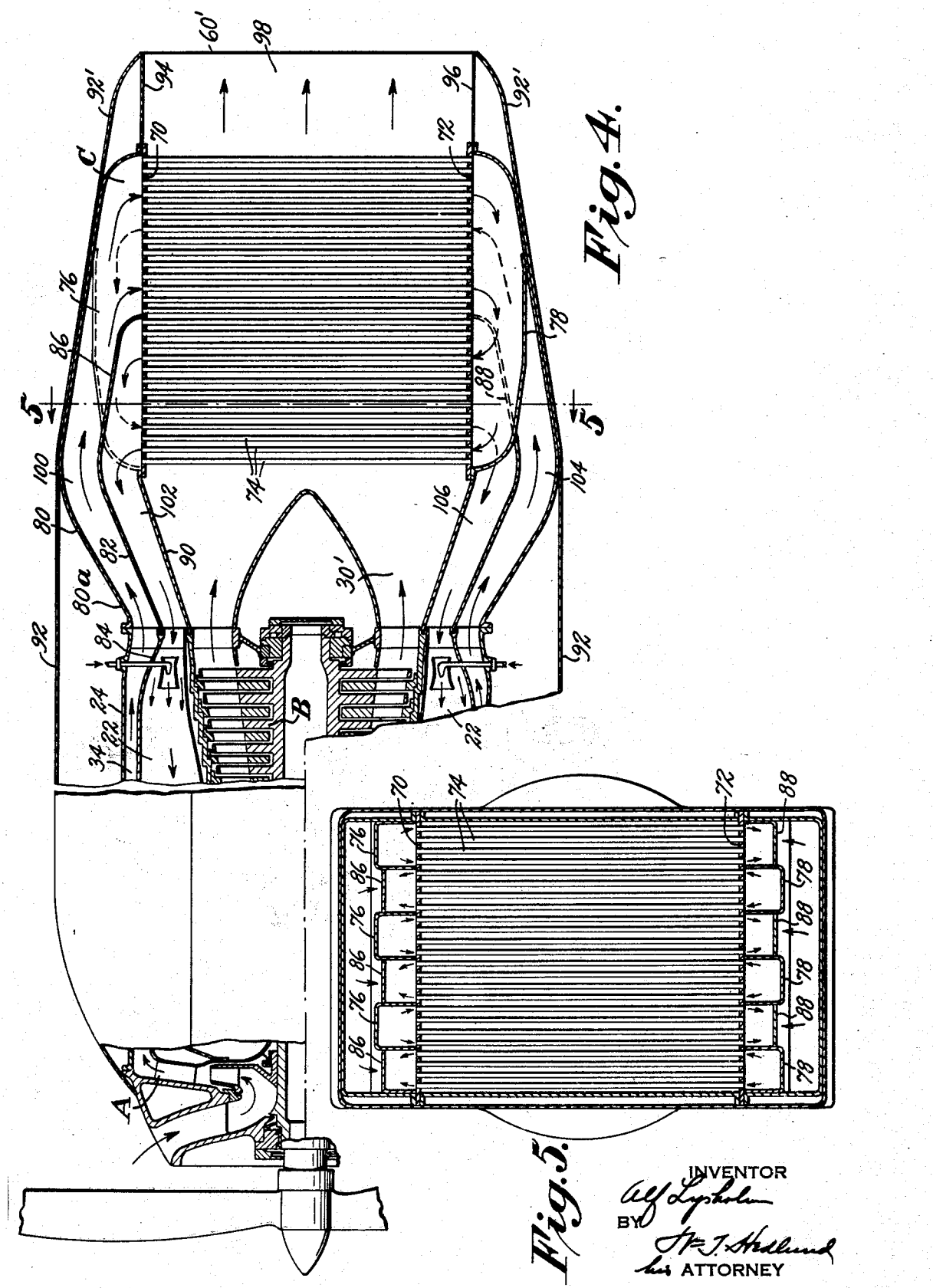

UNITED STATES PATENT OFFICE 2,162,956

AIRCRAFT POWER PLANT

Alf Lysholm, Stockholm, Sweden, assignor to Aktiebolaget Milo, Stockholm, Sweden, a corporation of Sweden Application February 14, 1934, Serial No. 711,088
In Germany February 16, 1933

3 Claims. (Cl. 170—135.6)

The present invention relates to aircraft and has particular reference to aircraft power plants of the continuous combustion gas turbine type. The invention also and more particularly relates to aircraft power plants in which propulsion of the craft at least in part is produced due to the rocket effect of exhaust motive fluid discharged from the power plant at high velocity rearwardly of the craft.

The nature of the invention, together with the several objects thereof may best be understood from a consideration of the ensuing description of the different embodiments of apparatus for carrying the invention into effect which are illustrated in the accompanying drawings, in which:

Fig. 2 is a longitudinal view, partly in elevation and partly in section and on a larger scale, of a power plant built in accordance with the invention;

Fig. 3 is a section taken on the line 3—3 of Fig. 2;

Fig. 4 is a longitudinal section partly in elevation of another power unit according to the invention; and Fig. 5 is a section taken on the line 5—5 of Fig. 4.

Figure 1:
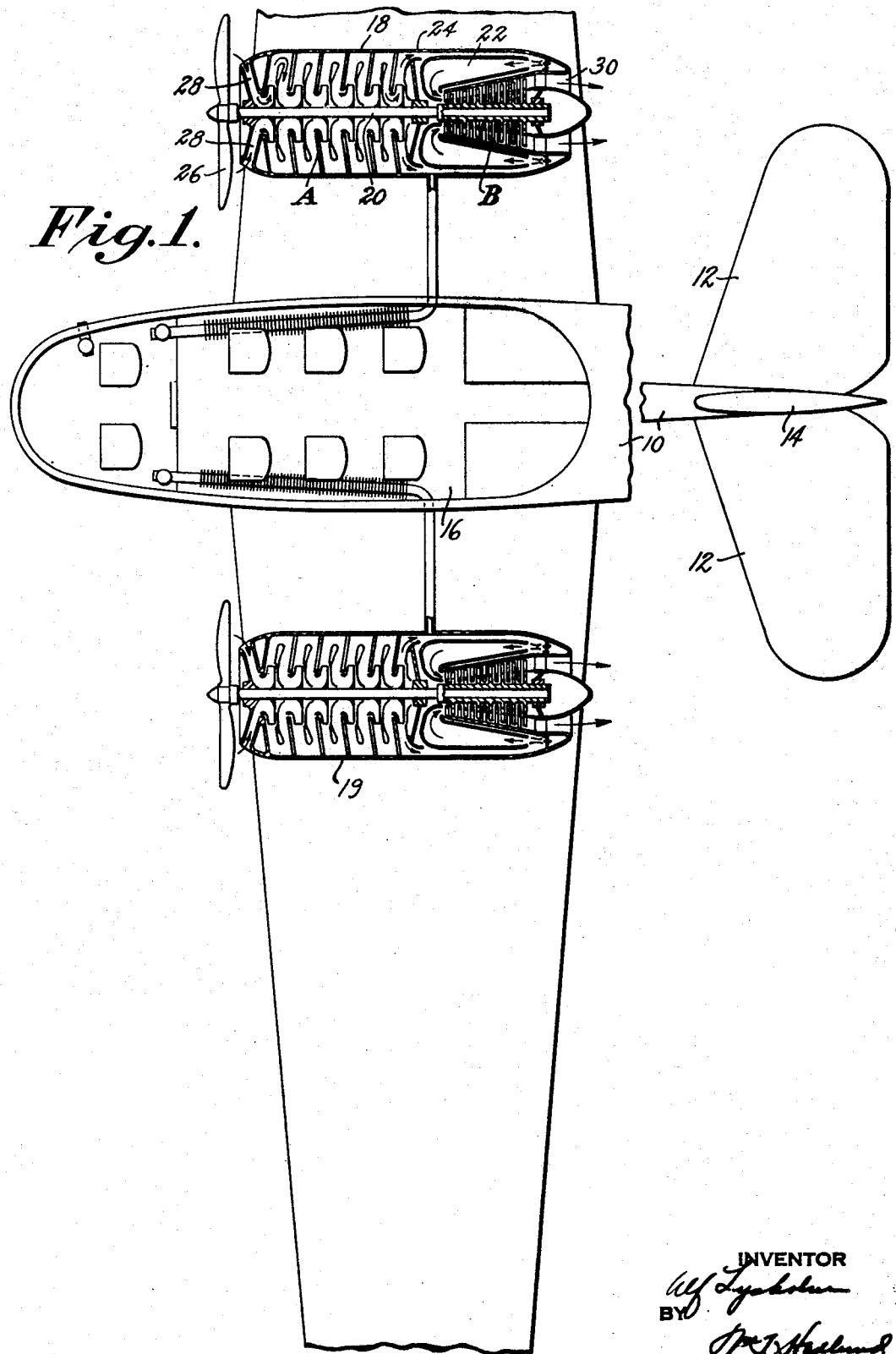
Fig. 1 is a broken plan view partly in section of an airplane embodying the invention.

Referring now to Fig. 1, the fuselage of the plane is indicated at 10 and carries at the rear the usual elevators 12 and rudder 14. In the forward part of the fuselage is located the cabin 16 of the plane.

The power plant in the embodiment illustrated comprises two power units designated generally at 18 and 19, mounted on the wings of the plane in the usual manner. These two units are alike in construction, and description of one will therefore be sufficent for present purposes.

The unit 18 comprises a compressor designated generally at A and having a rotor mounted on shaft 20 which extends longitudinally of the plane. Rearwardly of the compressor A and with a rotor mounted on an extension of shaft 20 is an axial flow gas turbine B. An annular combustion chamber 22 is located around the casing of the turbine B, and these parts are all enclosed by an outer shell 24 which is preferably streamlined as indicated in the drawings. At the forward end of shaft 20 there is mounted the propeller or air-screw 26, and behind this is located the air inlet 28 which admits air to the low pressure stage of the compressor. Air compressed in the compressor A is discharged at the rearward end of the compressor and passes from the space between the combustion chamber and the outer shell 24 to the rear of the combustion chamber, thence forwardly through the combustion chamber where it is heated by internal combustion of fuel supplied to the chamber. From the forward end of the combustion chamber the hot motive fluid thus produced is admitted to the inlet end of turbine B, which is located adjacent the rearward end of the compressor. In its path of expansion through the turbine the motive fluid flows from the forward inlet to a rearward outlet and from the outlet of the turbine the exhaust motive fluid is discharged rearwardly through the passage 30 to the atmospheric outlet of the unit. This rearward discharge of the motive fluid to atmosphere produces a reactive or rocket effect capable of materially assisting the propeller in the propulsion of the plane.

Turning now to Figs. 2 and 3, the constructions shown on larger scale therein are illustrative of the same general arrangement of parts. The compressor A and the turbine B are located within the common outer casing 24 with the rotors of each mounted on the shaft 20, which in the embodiment illustrated is built up of a number of separate hollow shaft parts. Forwardly of the compressor, shaft 20 is extended to carry the airscrew 26, and the annular air inlet opening 28 for the compressor is located directly behind the airscrew, so as to be situated directly in the slip stream of the air-screw where the maximum benefit may be derived from the effect of the airscrew forcing air into the inlet of the compressor. The outlet of the compressor, indicated at 32, discharges air to the space 34 between the outer shell 24 and the combustion chamber 22 which surrounds the turbine casing 36. The turbine casing is generally conical in form as indicated in the drawings with the small diameter inlet end of the casing located adjacent to the compressor. At its forward end the casing 36 is extended as indicated at 38 in the form of an annular flange adapted to be supported by the conical plate 40, which extends inwardly from the compressor casing to carry the intermediate shaft bearing 42. An annular admission chamber 44 is located in the space between parts 38 and 40 and is connected with the combustion chamber 22 by a number of passages, one of which is indicated at 46, which passages extend through suitable openings in the extension 38 of the turbine casing. Space is provided for flow of air past both the inner and outer walls of the combustion chamber in the manner indicated by the arrows on the drawings, some of the air flowing to the inlet openings 48, of which there are preferably a plurality distributed around the periphery of the chamber, and some of the air flowing between the admission chamber and the shaft structure to the inlet of the turbine as indicated by the arrows 50. Space is provided between the connection 46 and the web portions of the part 38 for flow of air to the space between the inner wall of the combustion chamber and the turbine casing. Adjacent to the inlet openings 48 cones 52 are provided for flow of primary air for the fuel supplied through nozzles 54. Nozzles 54 are carried by an annular plate 56 connecting the rear portion of the outer shell 24 with the outlet end of the turbine casing 36.

Fuel is supplied to the nozzles 54 in known manner, and also in known manner is regulated so that when burned with the air entering the combustion chamber it produces a gaseous motive fluid having a temperature preferably of at least 800° C. absolute. The compressor may deliver air to the combustion chamber at a pressure of, for example, four atmospheres. The inlet end of the blade system of the turbine, indicated generally at 58, is preferably kept as small as possible, and the length of the blades is preferably relatively great as compared with the diameter of the blade rows at the inlet end of the turbine. For example, the first row of turbine blades may be 200 millimeters in mean diameter with the blades having a length of 40 millimeters. In the embodiment illustrated in this figure and also in Fig. 1, all of the energy of the motive fluid need not be extracted by expansion in the turbine, since any residual energy of the motive fluid as exhausted from the turbine may be employed to produce rocket propulsion for assisting the airscrew in propulsion of the plane. When a substantial amount of rocket propulsion is desired, the motive fluid is not fully expanded in the turbine, and while the path of flow for motive fluid through the turbine is of increasing cross-sectional area from inlet to outlet of the turbine, the ratio of the lengths of the blades to the mean diameters of the blade rows is decreased from the inlet to the outlet end of the turbine rather than being maintained substantially constant, as is the case where full expansion of the motive fluid in the turbine is desired.

From the outer end of the turbine motive fluid is exhausted through passage 30 to the atmospheric outlet 60. This passage is substantially free and unobstructed since the rear shaft bearing 62 of the turbine shaft is carried by an end member comprising a plurality of thin radially extending webs 64, preferably stream-lined, which offer negligible resistance to flow of motive fluid. The inner wall of this passage 30 is formed by a conical end member or shield 66, and the outer wall is formed by part of an annular extension 68 at the rear of the plate 56. If substantial rocket propulsion is desired the passage 30 is made of diminishing cross-sectional area from the outlet of the turbine to the atmospheric outlet 60, so as to use the pressure of the motive fluid as exhausted from the turbine to accelerate the speed of the motive fluid in its flow through the passage to the outlet 60.

From the foregoing description and from an inspection of Fig. 2 of the drawings, it will be evident that the arrangement illustrated provides for a power unit which is highly efficient for the purposes intended. The entire unit is embodied in a stream-lined casing which minimizes resistance to the passage of the unit through the air, and the flow of air to and the flow of motive fluid from the unit is such that full advantage is taken of the forward motion of the unit through the air. By placing the compressor ahead of the axial flow turbine it is possible to provide for direct admission of air to the compressor from the slip stream of the propeller, thereby forcing air directly into the compressor and reducing the amount of work to be done by the compressor in compressing the air to the desired value. Positioning the axial flow turbine directly behind the compressor provides for a free and unobstructed outlet for exhaust motive fluid from the power unit in a direction opposite the direction of line of flight of the plane whereby to obtain the most efficient utilization of the exhaust motive fluid for rocket propulsion. The conical axial flow type of turbine arranged with respect to the compressor in the manner illustrated provides suitable spaces within the stream-lined casing for the combustion chamber, and with the combustion chamber arranged as shown it is possible to cause the compressed air from the compressor to flow over and around the combustion chamber so as to protect the turbine and shaft parts from heat radiated from the combustion chamber. Also, the air flowing around the outside of the combustion chamber serves to insulate it against the radiation of heat from the combustion chamber to the outer casing, and further serves to preheat the compressed air prior to its admission to the combustion chamber.

In order to increase the thermal efficiency of the power unit it is, in some instances, desirable to employ a regenerator, and in Figs. 4 and 5 an arrangement is shown whereby increased thermal efficiency due to the use of a regenerator may be obtained without sacrificing any of the advantages of the general arrangement of parts hereinbefore described.

Turing now to Figs. 4 and 5, the compressor is indicated at A and the turbine at B. The combustion chamber 22 is arranged around the turbine B in the manner previously described and air discharged from the compressor is discharged to the space 34 in the manner shown in Fig. 2. In this embodiment, however, a regenerator C in the form of a surface type heat exchanger, is located rearwardly of the turbine. It comprises spaced tube sheets 70 and 72 connected by a plurality of tubes 74 extending transversely of the outlet passage 30' leading from the exhaust end of the turbine. As shown more clearly in Fig. 5, the tube sheet 70 has associated therewith three axially extending transversely spaced inlet headers indicated at 76, while the tube sheet 72, has associated therewith three inlet headers 78 similarly arranged. Headers 76 are staggered transversely with respect to headers 78. The side walls of the passage 30' are provided by an outer casing part 80 which, at the place where the regenerator is located, is rectangular in cross-section, and which, forwardly of the regenerator, is bent to form a conical portion 80a secured to the rear end of the casing part 24 surrounding the combustion chamber. A partition member 82, circular at its forward end, and fitting into a suitable annular recess in the outer circular wall 84 of the combustion chamber, extends rearwardly of the combustion chamber, and the rear end of this partition member is formed with a plurality of tongues 86 and 88 which extend respectively between headers 76 and 78 to contact the tube sheets 70 and 72. A second partition member 90, circular at its forward end, fits into a suitable annular recess in the end of the turbine casing. At its rear end the partition member 90 is rectangular in cross-section and is attached to tube sheets 70 and 72. In order to streamline the entire structure, the casing parts 92 are provided, which extend forwardly from the casing part 80, and these casing parts may advantageously be extended to the rear as at 92', to support the plates 94 and 96 defining the top and bottom portions of an exhaust passage 98 at the rear of the regenerator C. The regenerator reduces the amount of energy in the motive fluid available for use in effecting rocket propulsion, but the reduction of this energy is compensated for by the increased thermal efficiency of the power unit. In order to make such use as is possible of the residual energy of the gases leaving the regenerator the outlet passage 98 may advantageously be made of diminishing cross-sectional area so as to convert the remaining pressure energy to velocity before the gases reach the atmospheric outlet 65.

In the arrangement illustrated air flowing from the upper part of the space 34 around the combustion chamber will pass to the space 100 and to the spaces between headers 76 at the rear of tube sheets 70. From these spaces this air will flow to the headers 78, and after flowing upwardly through the tubes in the forward portion of the regenerator with which the headers 78 are in communication, will pass through the space 102 to the combustion chamber 22. Similarly, air discharged from the lower portion of space 34 to the space 104 will pass between headers 78 and thence upwardly through the tubes at the rear of the regenerator to the headers 76. From headers 76 this air then flows downwardly to the spaces between the headers 78 at the forward end of the regenerator and from the latter spaces to the space 106 which is in communication with the combustion chamber 22. By means of this arrangement the air heated in the regenerator and flowing through spaces 102 and 106 is insulated against the outside atmosphere by cooler air flowing to the regenerator from spaces 100 and 104, and the loss due to heat radiation is accordingly reduced. This, taken in conjunction with the insulating action of the air flowing through the space 34 around the combustion chamber, serves to conserve heat energy without the necessity for the employment of special heat insulating means, which would add undesirable weight to the unit. Similarly, any heat passing from the exhaust gases into passage 98' through the partition member 90 is conducted directly to the slightly preheated air in passages 102 and 106 leading to the combustion chamber.

Mechanically, the construction shown presents practical advantages, since it is only necessary that the flanged portion or connection between the part 80a and the outer casing part 24 be made tight. The partition parts 82 and 90 do not have to be secured in the recesses in which they fit, but may be simply inserted therein when the parts are assembled by securing the flanged parts 80a and 24 together. There is relatively little, if any, differential expansion between the parts 82 and 90 and the turbine and combustion chamber walls into which they fit, so that simple joints of the character illustrated are sufficient.

It will be understood that the invention is not limited to the form of embodiment disclosed.

What I claim is:

1. In an aircraft having a continuous combustion gas turbine power plant for propelling the craft, in combination, a multiple stage axial flow gas turbine having a blade system of the reaction type, a compressor for compressing air to be used in the motive fluid for the turbine, said blade system being constructed to expand said motive fluid from its admission pressure to an exhaust pressure sufficiently low to extract from the motive fluid sufficient energy to perform the work of compression and to provide additional mechanical power, structure for mounting the compressor ahead of the turbine with the outlet end of the compressor adjacent to the inlet end of the turbine and so that the general direction of flow of air through the compressor is the same as the general direction of the flow of motive fluid through the turbine, said structure including means providing for direct admission of air to the inlet end of the compressor from the forward end of the unit and providing means for the discharge of substantially all of the exhaust gas from the turbine in a substantially direct path of flow rearwardly from the turbine to the atmosphere, whereby to utilize the reactive effect of the exhaust gases to assist in the propulsion of the aircraft, and a propeller driven by said turbine and located ahead of the unit, said means for admitting air to the compressor being located in the slip stream of the propeller.

2. In an aircraft having a continuous combustion gas turbine power plant for propelling the craft, in combination, a multiple stage axial flow gas turbine having a blade system of the reaction type, a rotary compressor for compressing air to be utilized in motive fluid for the turbine and a combustion chamber for burning fuel with air from said compressor to form said motive fluid, said blade system being constructed to expand said motive fluid from its admission pressure to an exhaust pressure sufficiently low to extract from the motive fluid sufficient energy to perform the work of compression and to provide additional mechanical power, structure including an elongated casing for housing the aforementioned parts, said structure including means for mounting the compressor ahead of the turbine in the housing with the outlet end of the compressor adjacent to the inlet end of the turbine and with the general direction of flow of air and motive fluid through the compressor and turbine respectively the same, and a propeller mounted at the forward end of the unit so that the air from the slip stream is forced into the inlet of the compressor, the rearward end of said casing structure extending rearwardly of said turbine and providing a path for flow of substantially all of the exhaust gases from the exhaust end of the turbine to the atmosphere without substantial change in its general direction of flow, whereby to utilize the reactive effect of the exhaust gases to assist in the propulsion of the craft.

3. In an aircraft having a continuous combustion gas turbine power plant for propelling the craft, in combination, a multiple stage axial flow gas turbine having a blade system of the reaction type, a rotary compressor for compressing air to be utilized in motive fluid for the turbine and a combustion chamber for burning fuel with air from said compressor to form said motive fluid, structure including an elongated casing for housing the aforementioned parts, said structure including means for mounting the compressor ahead of the turbine in the housing with the outlet end of the compressor adjacent to the inlet end of the turbine and with the general direction of flow of air and motive fluid through the compressor and turbine respectively the same, a propeller mounted at the forward end of the unit so that the air from the slip stream is forced into the inlet of the compressor, the rearward end of said casing structure extending substantially beyond the outlet end of said turbine and providing a substantially straight open passage of relatively large cross-sectional area for flow of exhaust gases from the outlet of the turbine to atmosphere in the same general direction as that of the flow of motive fluid through the turbine, and means providing a regenerating heat exchanger located in said passage for preheating the compressed air prior to admission thereof to the combustion chamber.

ALF LYSHOLM.